United States Patent [19]

Behrens et al.

[11] Patent Number: 5,089,193
[45] Date of Patent: Feb. 18, 1992

[54] METHOD FOR EXTRUDING A THERMOPLASTIC PLASTICS MATERIAL FOAM

[75] Inventors: Friedrich-Otto Behrens, Garbsen; Ulrich Prossler, Uetz/Krätze, both of Fed. Rep. of Germany

[73] Assignee: Hermann Berstorff Maschinenbau GmbH, Hanover, Fed. Rep. of Germany

[21] Appl. No.: 541,379

[22] Filed: Jun. 21, 1990

[30] Foreign Application Priority Data

Jun. 28, 1989 [DE] Fed. Rep. of Germany ....... 3921108

[51] Int. Cl.⁵ .............................................. B29C 47/00
[52] U.S. Cl. .................................. 264/50; 264/211.23; 264/DIG. 5
[58] Field of Search ................. 264/41, 50, 51, 53, 264/211.23, 211.21, 349, DIG. 5

[56] References Cited

U.S. PATENT DOCUMENTS

| | | | |
|---|---|---|---|
| 3,814,779 | 6/1974 | Wiley | 264/211.23 |
| 4,308,352 | 12/1981 | Knous | 264/53 |
| 4,393,017 | 7/1983 | Kim et al. | 264/211.21 |
| 4,409,165 | 10/1983 | Kim | 264/211.23 |
| 4,424,287 | 1/1984 | Johnson et al. | 264/50 |
| 4,455,272 | 6/1984 | Schubert et al. | 264/53 |
| 4,470,938 | 9/1984 | Johnson | 264/50 |
| 4,548,776 | 10/1985 | Holdredge | 425/205 |

Primary Examiner—Jan H. Silbaugh
Assistant Examiner—Brian J. Eastley
Attorney, Agent, or Firm—Foley & Lardner

[57] ABSTRACT

A method of extruding a foamed thermoplastic plastics material wherein the plastics material and a pore regulating agent are fed into an extruder and are fused in a fusion zone. The pressure of the fused material is augmented in a further zone and the material is then caused to flow past or through an obstruction so as to be converted into the form of thin layers or strands. Thereafter, steam and a propellant are sequentially injected into the fused mixture in injection zones. The steam is either saturated or superheated and has a temperature not lower than that of the mixture. The pressure of the mixture upstream of the obstruction is higher than the vapor pressure of the steam downstream of the obstruction. The pressure of the fused mixture and steam, while the propellant is being injected, is greater than the condensation pressure of the steam. The mixture is then cooled and discharged in a still further zone whereupon it foams.

10 Claims, 1 Drawing Sheet

METHOD FOR EXTRUDING A THERMOPLASTIC PLASTICS MATERIAL FOAM

FIELD OF THE INVENTION

The present invention relates to a method and apparatus for extruding a thermoplastic plastics material foam. More particularly the present invention relates to a method and apparatus which enable a foamed structure having a uniform cell size to be produced and which utilise environmentally friendly propellants.

BACKGROUND OF THE INVENTION AND PRIOR ART DISCUSSION

A method and apparatus for producing an extruded polystyrene foam is disclosed in German Patent Specification No. DE 33 10 751A1. The apparatus disclosed in this prior document comprises an extruder, the interior of which is sub-divided into a plurality of zones. Initially, a mixture of polystyrene and a nucleating agent is fed into such an apparatus and is fused in a fusion zone. The fused mass then enters a zone in which the pressure of the fused mass is caused to increase. Thereafter, the fused mass passes into an injection zone wherein it has a propellant and water injected thereinto. Finally, the mixture passes into a cooling and discharge zone from which it is subsequently extruded through an annular nozzle. There is thus formed a hose, which is subsequently cut open, laid flat and wound. Such method produces a polystyrene foam, the cell structure of which is a combination of large and small cells.

A structure having a uniform cell size cannot be produced utilising this known method. This is because it is not possible to ensure a uniform distribution of the injected water in the hot fused mass of plastics material, which latter generally has a temperature lying in the range of from 150° to 250° C.

OBJECTS OF THE INVENTION

The present invention seeks to provide a method of producing an extrudable, foamed plastics material in which environmentally friendly propellants can be used. In particular, the present invention seeks to provide a method in which steam can be introduced into the fused plastics material, in the form of an additional propellant, the steam being in a very fine form and being uniformly distributed in the fused material so that a structure having a uniform cell size can be produced. The present invention also seeks to provide an apparatus suitable for carrying out such a method.

SUMMARY OF THE INVENTION

According to the present invention, there is provided a method of extruding a thermoplastic plastics material foam comprising the steps of feeding the plastics material, together with a pore regulating substance, into a screw extrusion device, fusing the mixture, augmenting the pressure of the fused material, injecting steam and a propellant into the fused mass of plastics material and cooling and discharging the injected fused mass to cause the mass to foam, wherein the fused mass, subsequent to the augmentation of the pressure thereof, is caused to flow past an obstruction and saturated or superheated steam is injected into the fused mass downstream of the obstruction, said injection being effected through the wall of the extrusion device, the obstruction being so formed as to produce thin layers or strands of the fused mass, the temperature of the injected steam corresponding substantially to that of the fused mass, the pressure of the fused mass upstream of the obstruction being higher than the vapour pressure of the saturated or superheated steam downstream of the obstruction and wherein a propellant is injected into the fused mass subsequent to the injection of the steam, the pressure of the mixture of fused mass and steam during the injection of the propellant being maintained at a level above the condensation pressure of the steam.

Also according to the present invention there is provided an extrusion device for extruding a thermoplastic plastics material foam comprising at least one rotatable screw mounted for rotation in a hollow barrel, the interior of the barrel comprising a fusion zone, a pressure augmentation zone, a steam injection zone, a propellant injection zone and a cooling and discharge zone, which zones are sequentially traversed by the plastics material, in which each at least one screw comprising a plurality of sections, one in each individual zone, and in which injection nozzles for steam and for a propellant are provided, which nozzles guide the steam and propellant into the interior of the hollow barrel, the steam injection zone having a free extrusion volume greater than the free extrusion volume in the pressure augmentation zone.

By injecting saturated or superheated steam, instead of water, into a zone of the extrusion device in which the pressure of the fused mass is reduced, it is possible to prevent a condensate being formed. In consequence, the steam is still in the vapour phase when it is mixed with the fused mass.

Optimum distribution of the steam in the fused mass is achieved if the fused mass in the reduced pressure or even pressureless zone of the housing of the extrusion device, is extruded into the vapour atmosphere in the form of thin layers or strands. Since the fused mass already contains a pore regulating substance, such as talc, molecules of water vapour are deposited both on the finely distributed talc particles and on the surface of the fused mass. In consequence, a very fine distribution of the steam in the fused mass is achieved when the thin layers or strands are remixed by the screw threads of the extrusion device subsequent to the steam injection.

As the pressure of the mixture of the steam and fused mass increases subsequent to the steam injection, the steam will condense. Since steam has a very large specific volume compared with water $-1673$ $dm^3$/kg of steam only occupy 1.0437 $dm^3$/kg at 373° K. when condensed—tiny water droplets are produced as a result of the condensation. These droplets are, in consequence, distributed in the fused mass in a microscopically fine manner and deposited on the pore regulating particles.

This superfine distribution of water vapour is considerably enhanced by the formation of thin layers or strands of the fused mass prior to their extrusion into the steam atmosphere.

It is thus possible for the first time to distribute water into a fused mass of plastics material in an extremely homogeneous and very fine manner. Accordingly a very uniform foam structure is produced when the fused mass foams. Such foaming occurs as the result of the evaporation of the water droplets at the outlet nozzle of the extrusion device due to the pressure drop.

The foaming process itself is assisted by the use of a propellant such as nitrogen.

The water vapour is injected and mixed in a reduced-pressure injection zone of the extrusion device and the pressure of the fused mass is subsequently reincreased by, for example, providing a reduction in the volume of screw threads. The steam condenses to form microscopically small droplets and hence the propellant, which has a pressure which exceeds the pressure of the mixture of the fused mass and vapour, is injected into the fused mass. The nitrogen is preferably deposited on the tiny water droplets. The fused mass is subsequently mixed homogeneously with the propellant, cooled and extruded to form a hose.

As the condensed water, which is admixed with the fused mass, emerges from the annular outlet nozzle of the extruder, it evaporates because of the reduction in pressure. Steam is again produced which substantially increases the volume of the mixture and small cells are formed. The evaporation of the water removes heat from the cells, which are formed by the propellant and the evaporation process, so that the cell walls begin to solidify. The cells are thus stabilised, and such a phenomenon is a further advantage of the use of steam which acts as an additional propellant.

The nitrogen, as a propellant, helps to maintain the cells stable, since the steam, that is to say, the water subsequent to the evaporation process, recondenses in the cells as the foam emerges from the nozzle and, in consequence, reduces in volume.

However, as the mixture emerges from the nozzle the nitrogen simultaneously expands. The cells, produced by the evaporation of the water and also during emergence of the mixture from the nozzle, are prevented from collapsing by this expansion of the nitrogen. In consequence, the nitrogen acts as an internal pressure stabiliser for the cells which are formed.

A further advantage of a foam which is produced by the method of the invention is that a subsequent foaming process can be effected by reheating the foam to a temperature above 373° K. (100° C.) because of the presence of the recondensed water droplets, which are microscopically small, in the foamed and already solidified plastics material. In such a case, the tiny water droplets can be converted once more into the vapour phase by, for example, subjecting the foam to microwave radiation. By so doing, the internal pressure in the cells increases. If heating to the softening point of the plastics material is effected, the cells expand without cracking.

As a result of this measure, the weight per unit volume the (density) of the foam is lowered in a very simple manner and possible applications of the foam are considerably increased. In addition, tensions in the extruded plastics material can be eliminated by such a subsequent foaming process; such tensions being produced in the plastics material during the extrusion of the foamed hose.

BRIEF DESCRIPTION OF THE DRAWINGS

The present invention will be further described, by way of example, with reference to the accompanying drawings.

DESCRIPTION OF PREFERRED EMBODIMENTS

Figures 1, 2, 3:
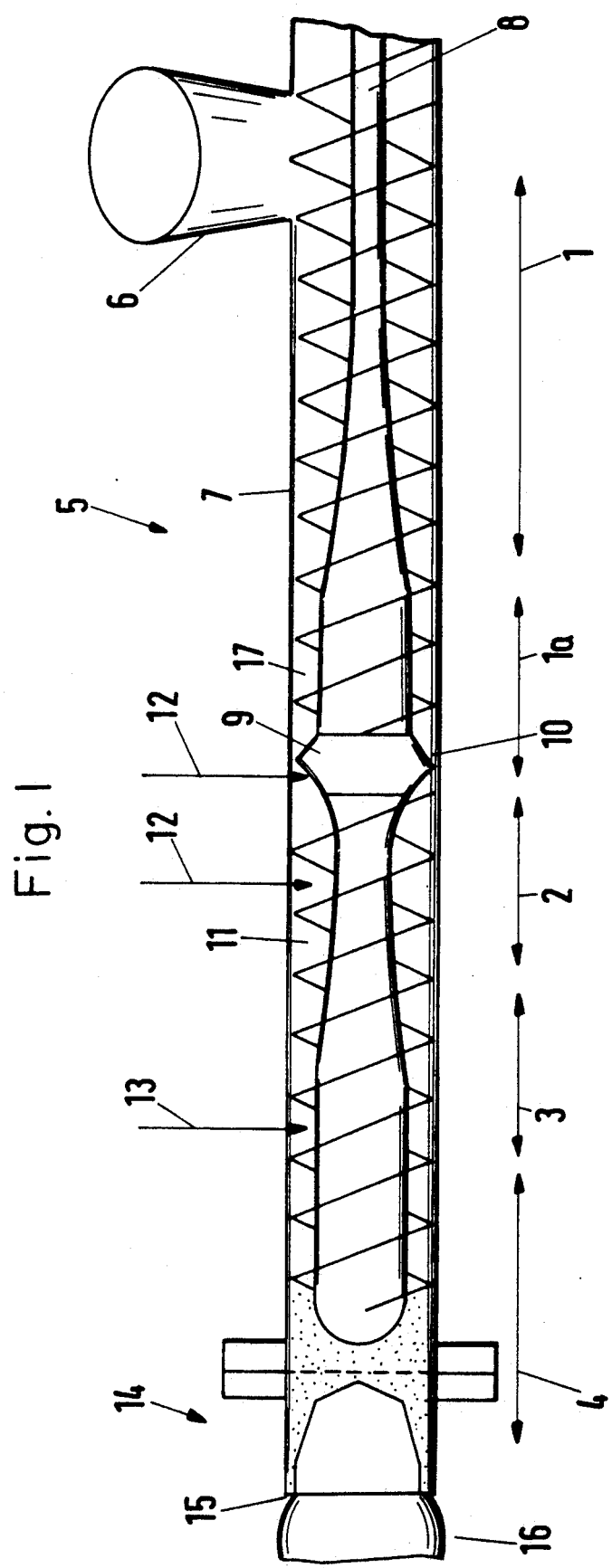
FIG. 1 shows a schematic longitudinal section through an extrusion apparatus in accordance with the present invention.
FIG. 2 shows a cross-sectional view of a blister forming an annular clearance.
FIG. 3 shows a cross-sectional view of a perforated disc having small diameter throughbores.

In the drawings, there is shown an extrusion device, generally referenced 5. The interior of the device comprises a plurality of different treatment zones. In the direction of passage of a thermoplastic plastics material through the device, these zones are, in sequence, a fusion zone 1, a pressure augmentation zone 1a, a steam injection zone 2, a propellant injection zone 3 and a cooling and discharge zone 4.

Further details of the device 5 and the way which the device operates will now be described.

Polystyrene granules, to which has been added a pore regulator or a nucleating agent, in the form of talc, are fed into the fusion zone 1 through a feed hopper 6. The extrusion device comprises a housing 7 in which a screw 8 rotates. The rotation of the screw 8 causes fusion of the polystyrene, which fusion is substantially completed in the fusion zone 1 of the extrusion device. The pressure of the fused mass is then augmented to a maximum of 400 bar in the zone 1a.

Thereafter, the fused mass is caused to pass over a blister 9. A narrow annular clearance 10 is defined between the edge of the blister 9 and the internal surface of the barrel, so that the fused mass is in the form of very thin layers when it enters the injection zone 2. In the zone 2, the screw 8 has a deep thread 11. The pressure of the fused mass is thus reduced to such an extent that dry-saturated or superheated steam may be injected thereinto.

In the pressure-reduced injection zone 2, steam at a temperature of, for example, 260° C., is injected into the fused mass, which latter has a temperature which is lower than or equal to 260° C. Such injection is effected through injection nozzles 12, which are not shown in detail. The steam is immediately deposited onto the hygroscopic talc particles used as the pore regulators which have been exposed in the formation of the thin layers of fused mass by its passage through the annular clearance 10.

In the injection zone 2, the thin layers of the fused mass are then mixed with the steam by the rotating screw. A pressure of approximately 280 bar is once more built-up in the fused mass in the propellant injection zone 3.

The steam molecules, which are deposited onto the talc and onto the surface of the fused mass, condense as a result of this increase of pressure and/or because there is a slight reduction in the temperature of the fused mass. This causes a sharp reduction in the volume of the steam and, in consequence, a microscopically fine distribution of the droplets of water which have condensed, is achieved in the fused mass.

A propellant, in the form of nitrogen at a pressure of from 170 to 300 bar, which pressure exceeds the vapour pressure of the water and the pressure of the fused mass, is then injected into the fused mass through nozzles 13. The nitrogen is preferably deposited onto the microscopic water droplets, so that the distribution of the nitrogen is further enhanced.

The fused mass, now enriched with nitrogen and water, is subjected to an intensive mixing and cooling treatment in the cooling and discharge zone 4. Such treatment is effected by rotation of the screw 8. The mass is then conveyed into the extrusion head 14.

In cooling zone 4, the mixture is cooled to a temperature of the order of 150° C. by cooling the screw. The cooling can be enhanced by cooling the housing of the extrusion device in this zone. A pressure of the order of 100 bar prevails in the head 14.

The fused mass then emerges from the head 14 through an annular nozzle 15 and, immediately after emergence therefrom, foams to form a layer which forms a flexible tube 16.

Because pressure is immediately removed from the fused mass at the outlet of the nozzle 15, the water droplets evaporate due to the temperature of the fused mass being of the order of 150° C. Accordingly, a large increase in volume occurs. The nitrogen also expands and forms cells in the mass. The evaporation of the water causes heat to be removed from each cell, thereby solidifying the cell walls.

The hose 16 cools as it emerges from the nozzle and the water which had evaporated at the nozzle output condenses. This causes a considerable contraction in volume and the nitrogen serves to stabilise the cell walls.

The present invention will be further described, by way of illustration with reference to the following non-limitative Example.

EXAMPLE

Polystyrene (99.5 kg) was homogeneously mixed with talc (0.5 kg) and fed, in a metered manner, into the fusion zone of the extrusion device shown in the accompanying drawings. The mixture was fused continuously. Steam (237 dm$^3$) at a pressure of 10 bar and at a temperature of 250° C. was continuously injected into the injection zone 2 through the nozzles 12. A pressure of 10 bar was set in the injection zone. The fused mixture was pressed over the blister 9 to form thin layers and extruded into the steam atmosphere prevailing in the injection zone 2.

After the thin layers of fused mass had been mixed with the injected steam, nitrogen (0.5 kg/h) at a pressure of 300 bar was introduced, in a metered manner into the fused mass through the nozzle 13. A pressure of 100 bar and a temperature of 150° C. were set in the cooling and discharge zone 4 by cooling the extruder barrel and screw. The fused mass was extruded through the annular nozzle 15 and foams as it does so.

The weight per unit volume of the foam material was 81 kg/m$^3$. This must be regarded as a very acceptable value. Such weights per unit volume were also achieved with other types of polystyrene, as was confirmed by a series of tests using different types of polystyrene which was foamed, in each case, with nitrogen and water vapour.

Even better results, with regard to the weight per unit volume were obtained by using a perforated disc 18 having small diameter throughbores instead of the blister 9 forming the annular clearance 10. This produces an even better distribution of the steam because the strands of fused mass have an extremely small diameter and therefore a large surface area. Cross-sectional views of the blister 9 and the disc 18 are shown in FIGS. 2 and 3.

We claim:

1. A method of extruding a thermoplastic plastics material to produce a foamed structure having uniform cell size, comprising the steps of:

feeding plastics material and a pore regulating substance into a screw extrusion device to form a mixture, said extrusion device including a rotatably mounted screw, fusing the mixture to form a fused mass, increasing the pressure of the fused mass, passing the pressurized fused mass past an obstruction disposed in said screw extrusion device to increase the free surface area of said fused mass and correspondingly reduce the pressure just past said obstruction, injecting steam at a desired temperature into said fused mass downstream of said obstruction thereby producing a vapor pressure, the pressure of said fused mass upstream of said obstruction being higher than the vapor pressure of the injected steam downstream of said obstruction, and the temperature of said injected steam corresponding substantially to the temperature of said fused mass in the injection area, mixing said fused mass with the steam by said screw so that the pressure is again built up, injecting a propellant into said mixture of said fused mass and steam, maintaining the pressure of said mixture of said fused mass and said steam during said injection of said propellant at a level above the condensation pressure of said steam, cooling said injected fused mass, and discharging said injected fused mass at atmospheric pressure to cause said steam to expand and said mass to foam.

2. A method as recited in claim 1, wherein said obstruction is a blister and wherein said extrusion device comprises a barrel including a cylindrical internal wall defining a hollow interior for receiving said rotatable screw, wherein said screw comprises a plurality of screw sections with said blister being covered by said screw intermediate two of said screw sections, and wherein said blister and said internal wall jointly define an annular gap for said fused mass whereby said fused mass emerges past said blister in the form of thin layers.

3. A method as recited in claim 1, wherein said extrusion device comprises a barrel including a cylindrical internal wall defining a hollow interior for receiving said rotatable screw, wherein said screw comprises a plurality of screw sections, and wherein said obstruction is a disc mounted on said screw intermediate two of said screw sections, said disc defining a plurality of throughbores disposed in the path of said fused mass whereby said fused mass emerges past said disc in the form of thin strands.

4. A method as recited in claim 1, wherein said steam is saturated.

5. A method as recited in claim 1, wherein said steam is superheated.

6. A method as recited in claim 1, wherein said injected steam has a temperature lying in the range of from 120° C. to 300° C. and said fused mass of plastics material has a temperature lying in the range of from 115° C. to 290° C.

7. A method as recited in claim 1, wherein said pressure of said fused mass upstream of said obstruction lies in the range of from 200 bar to 400 bar and the vapor pressure downstream of said obstruction lies in the range of from 1 bar to 60 bar.

8. A method as recited in claim 1, wherein said thermoplastic plastics material is polystyrene and the temperature of said fused polystyrene, during said injection of steam, lies within the range of from 200° C. to 280° C., the pressure of said fused mass during said injection being reduced to below 60 bar in dependence upon said temperature.

9. A method as recited in claim 8, wherein the pressure of said fused mass injected with steam is increased to a pressure lying within the range of 150 bar to 280 bar during said injection of propellant, and wherein said pressure of said propellant-injected mass during said cooling and discharge is maintained higher than the vapor pressure prevailing during said cooling and discharge.

10. A method as recited in claim 1, wherein said thermoplastic plastics material is polyethylene and the temperature of said fused polyethylene, during said steam injection, lies within the range of from 130° C. to 200° C., and wherein the pressure of said fused mass during said injection is reduced to below 16 bar in dependence upon said temperature.

* * * * *